(12) United States Patent
Otten et al.

(10) Patent No.: US 6,516,880 B1
(45) Date of Patent: Feb. 11, 2003

(54) SYSTEM, METHOD AND APPARATUS FOR DEPLOYING A DATA RESOURCE WITHIN A THREADED PIPE COUPLING

(75) Inventors: Gregory K. Otten, Houston, TX (US); Martin McIville Morrish, Plantersville, TX (US)

(73) Assignee: Grant Prideco, L.P., The Woodlands, TX (US)

( * ) Notice: Subject to any disclaimer, the term of this patent is extended or adjusted under 35 U.S.C. 154(b) by 91 days.

(21) Appl. No.: 09/675,697

(22) Filed: Sep. 29, 2000

(51) Int. Cl.[7] ............................................. E21B 47/01
(52) U.S. Cl. ................. 166/250.11; 166/65.1; 166/242.6
(58) Field of Search ............... 166/250.11, 255.1, 166/65.1, 66, 242.6, 242.7

(56) References Cited

U.S. PATENT DOCUMENTS 4,799,544 A * 1/1989 Curlett ..................... 166/65.1
4,821,035 A * 4/1989 Hanson et al. .............. 340/856
5,749,605 A * 5/1998 Hampton, III et al. ....... 285/48

* cited by examiner

*Primary Examiner*—David Bagnell
*Assistant Examiner*—Zakiya Walker

(74) *Attorney, Agent, or Firm*—Carlos A. Torres; Browning Bushman P.C.

(57) ABSTRACT

A data resource specific to a pipe coupling centrally positioned within the coupling, intermediate the coupling ends. Multiple couplings are employed to connect together a string of well pipe. The data resource is adapted to be deployed at the coupling center in the space formed between the abutting ends of pipe made up into the coupling. The data resource provides information regarding the physical characteristics and locations of the coupling, the attached string pipe or the environment within which the coupling is disposed. The data resource may be a read-only component or it may be a readable and writeable component. The resource communicates with an instrument movable through the pipe and coupling. The data resource may be removably positioned at the center of the coupling or it may be permanently cemented in place. The data resource may take on the form of an annular ring with a crushable structure and suitable recesses for holding a data resource module. A circular communication antenna may be carried in the ring. A preferred form of the data resource is an externally threaded Teflon® ring equipped with axially extending resilient fingers. The resilient fingers are deformable upon engagement with the rotating ends of the pipe sections so that advancing the pipe sections beyond their optimum depth into the coupling deforms the fingers without rotating and thus displacing the ring. The body of the ring remains in the gap between the pipe and where it is protected from crushing.

24 Claims, 13 Drawing Sheets

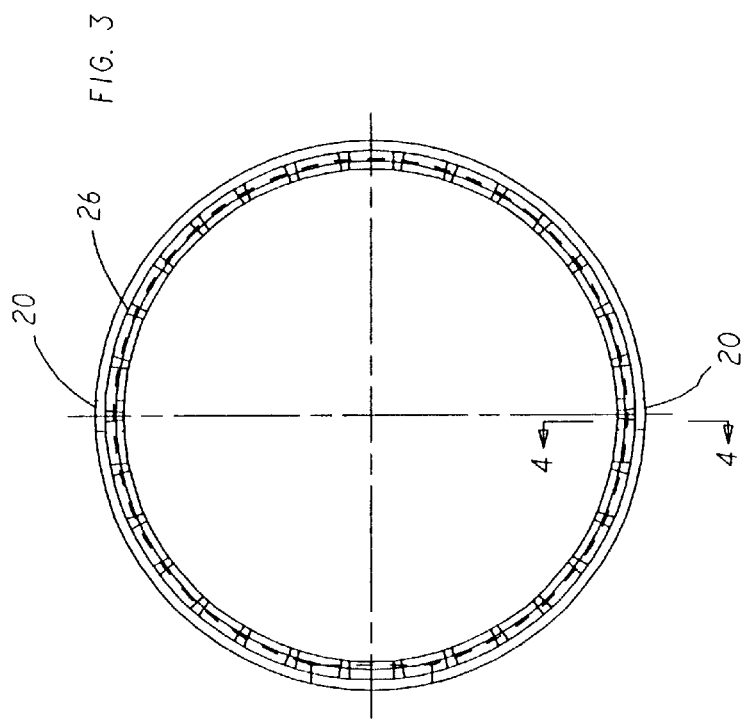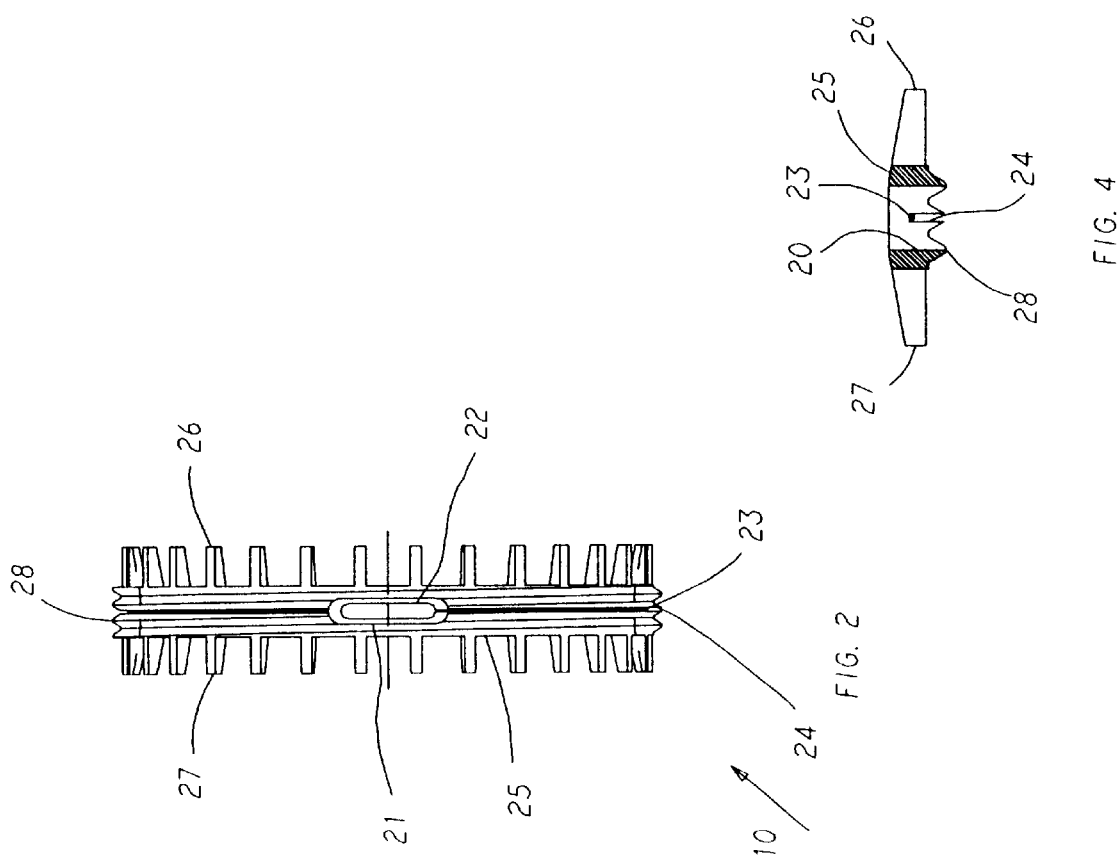

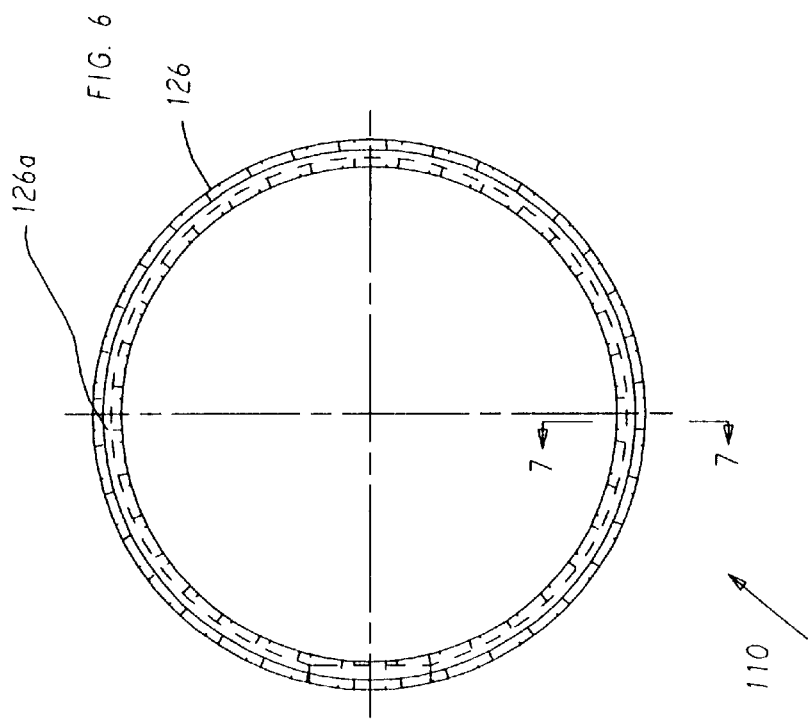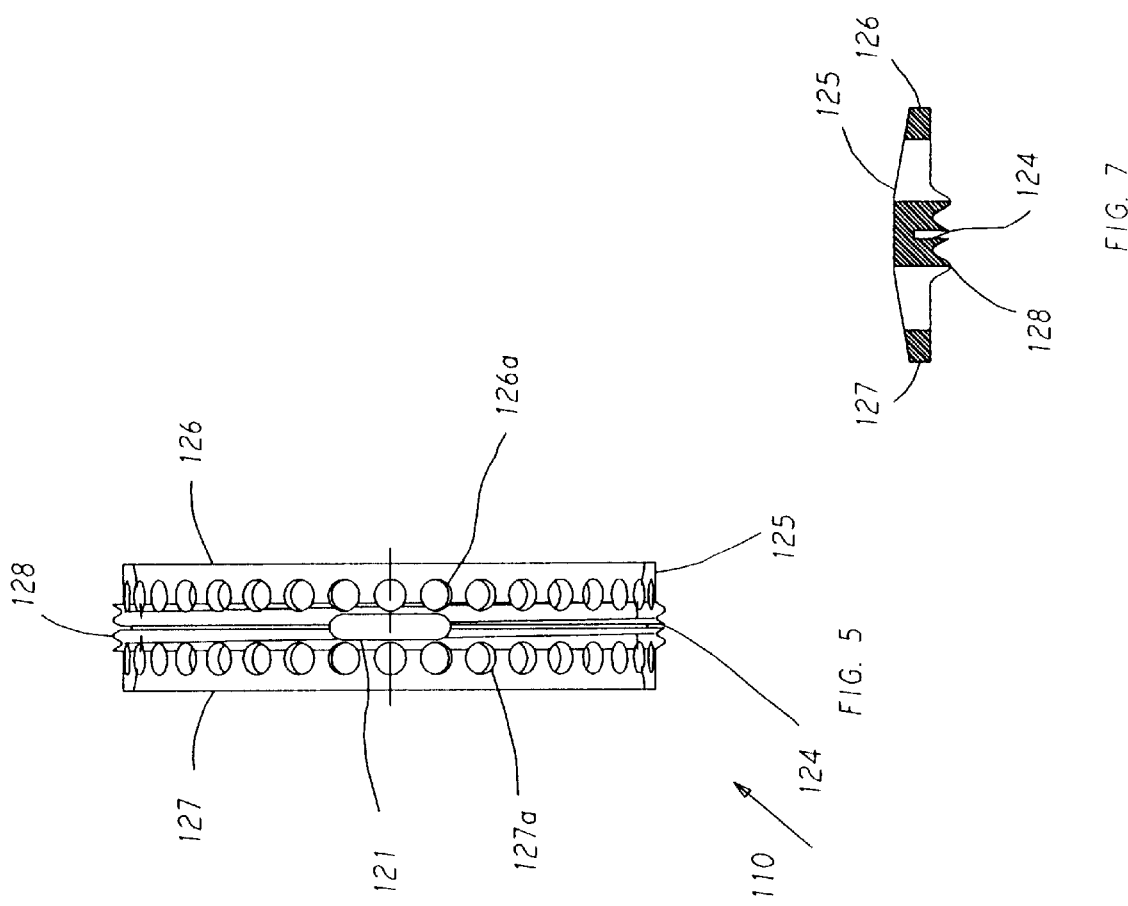

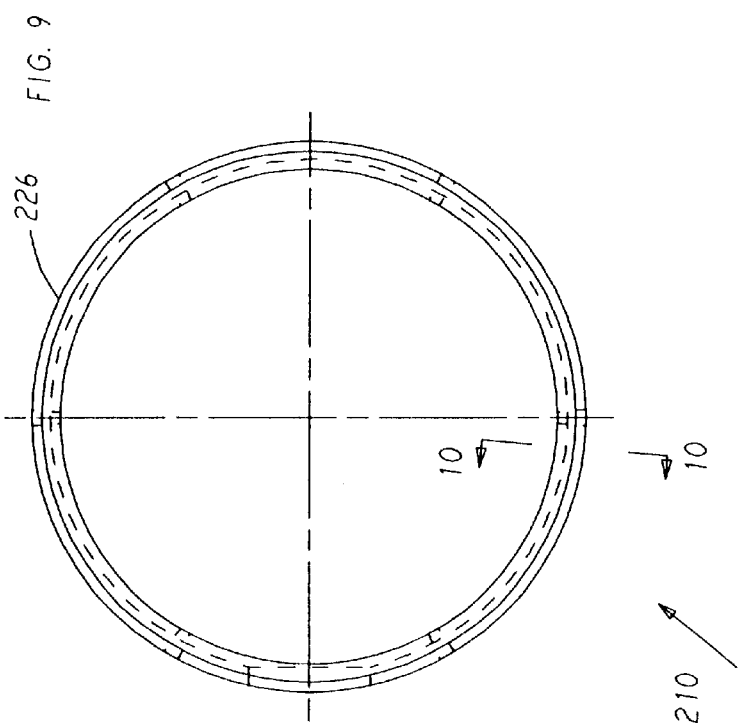
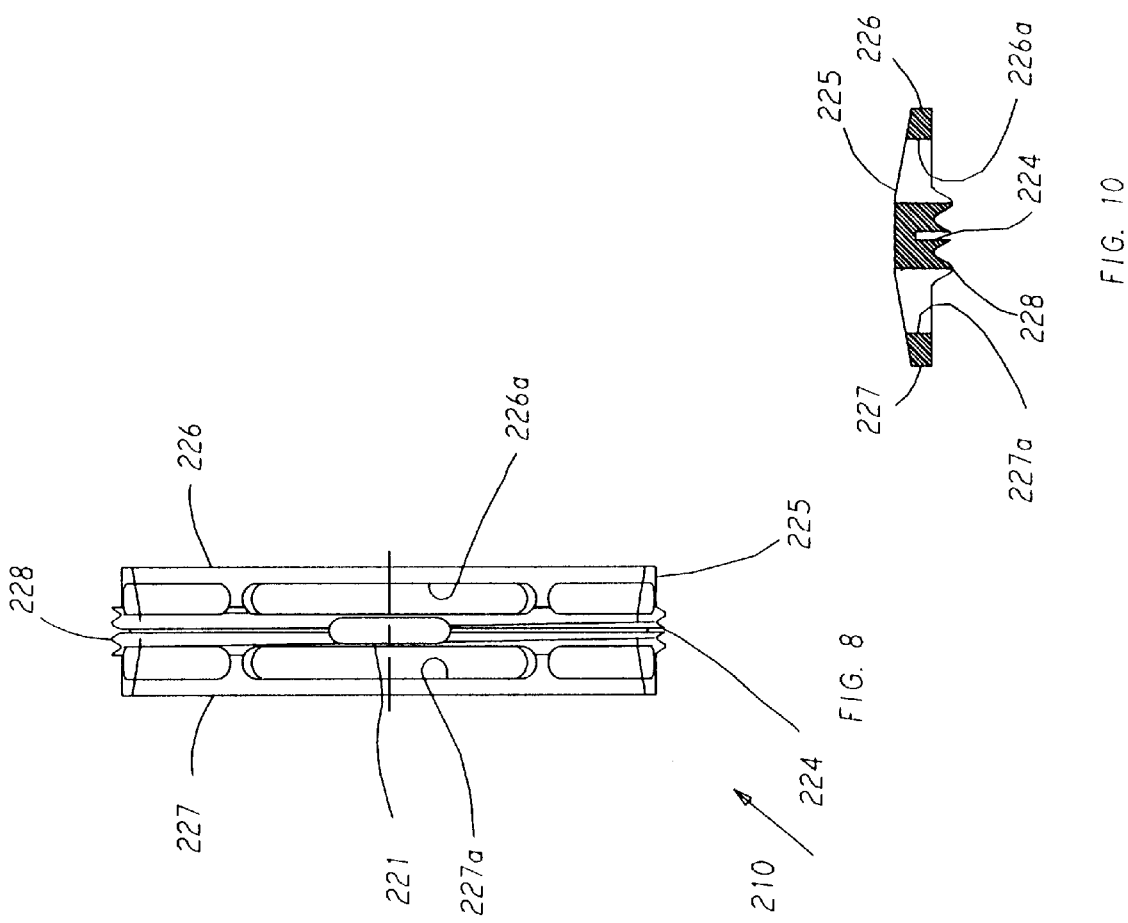

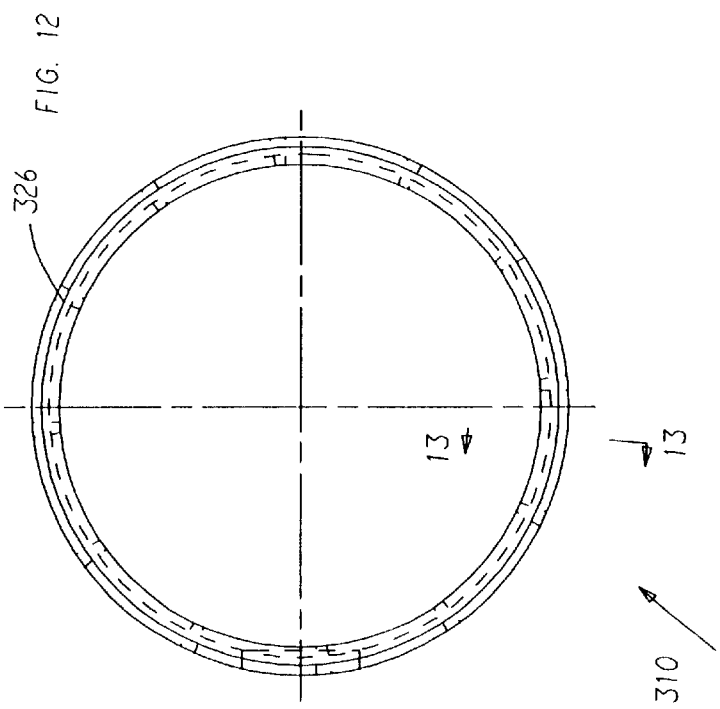
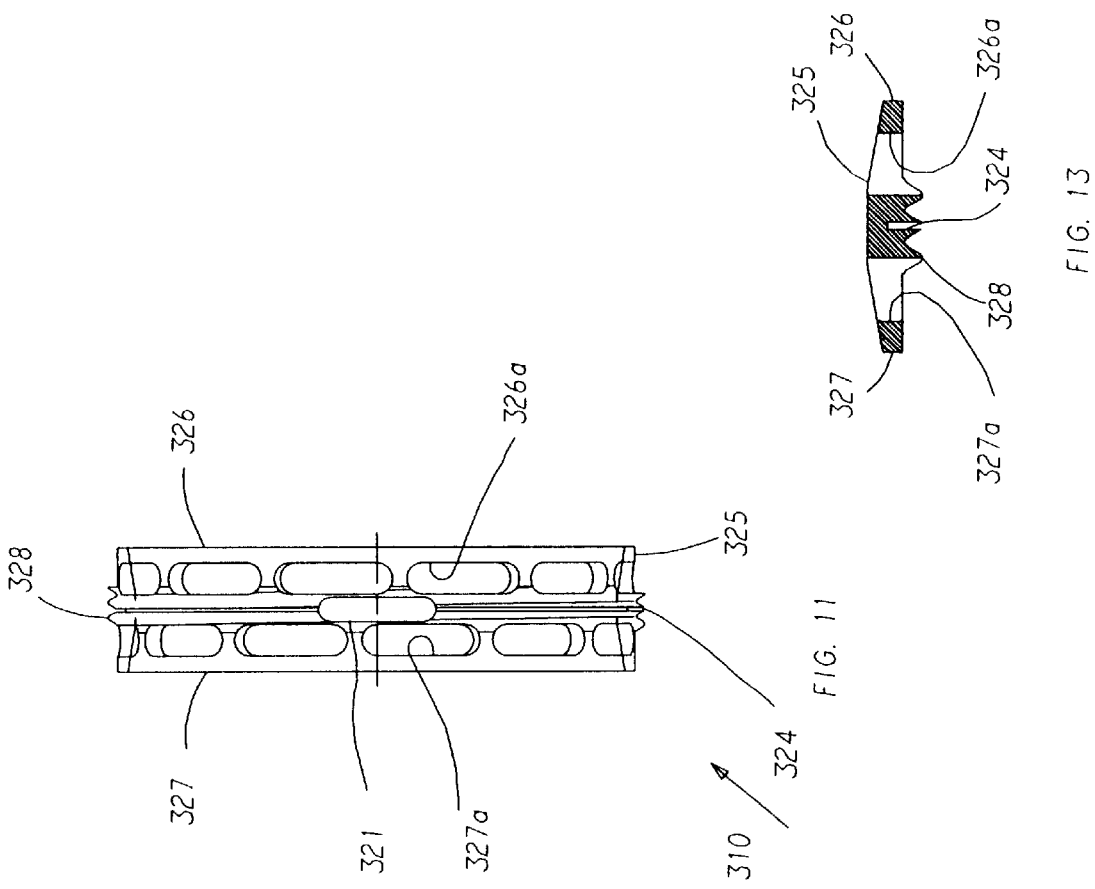

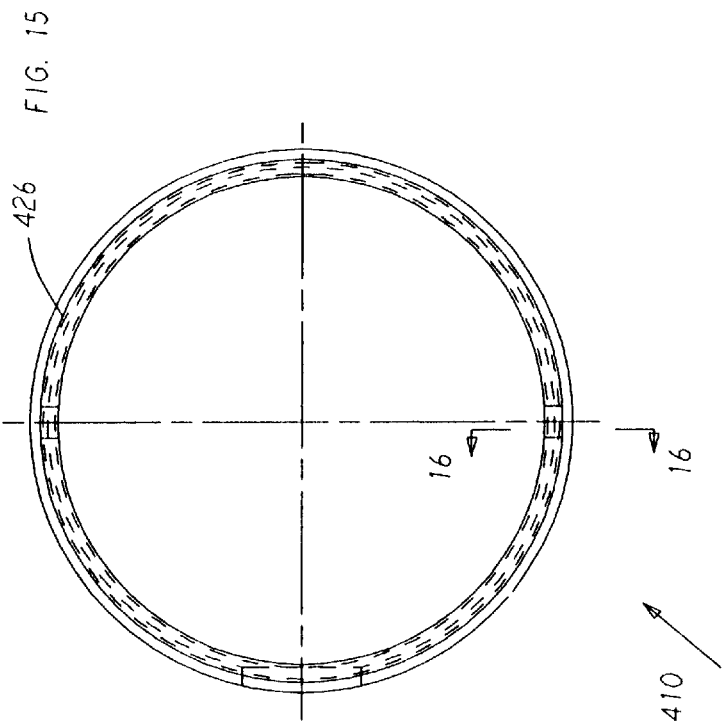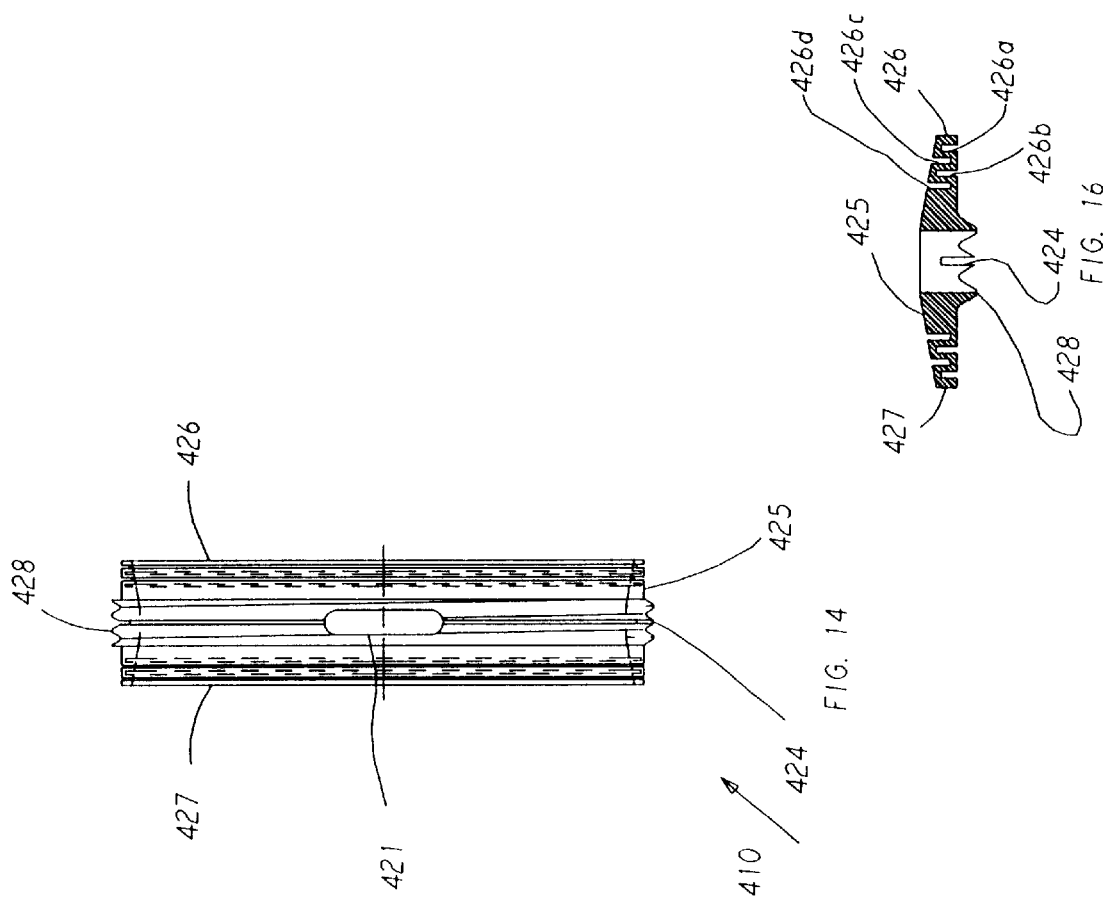

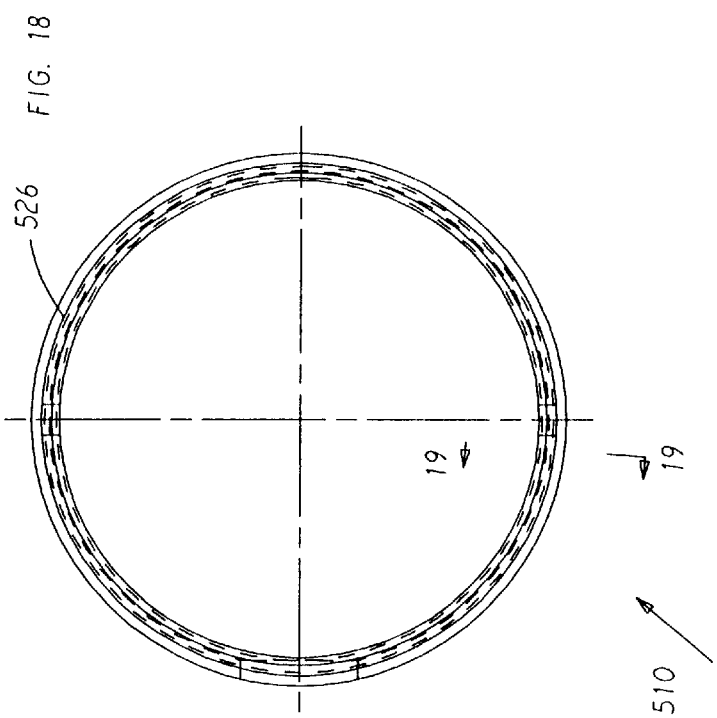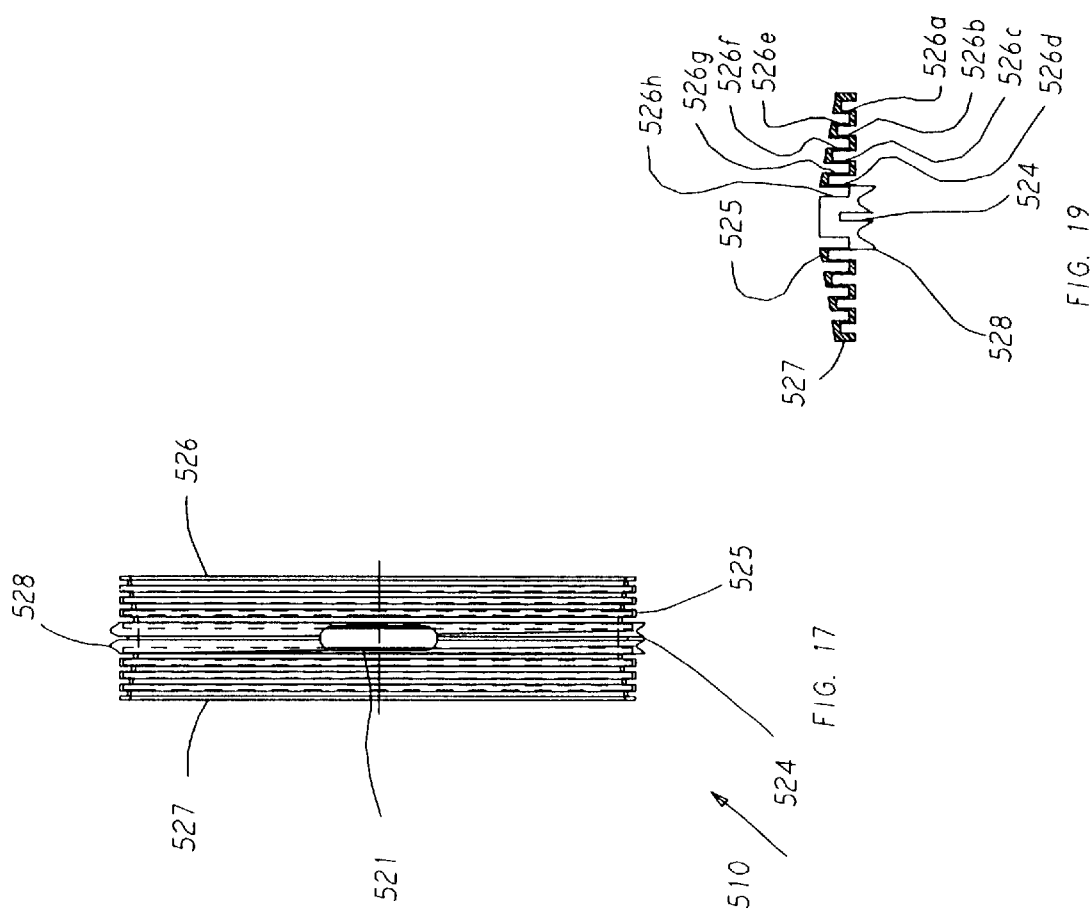

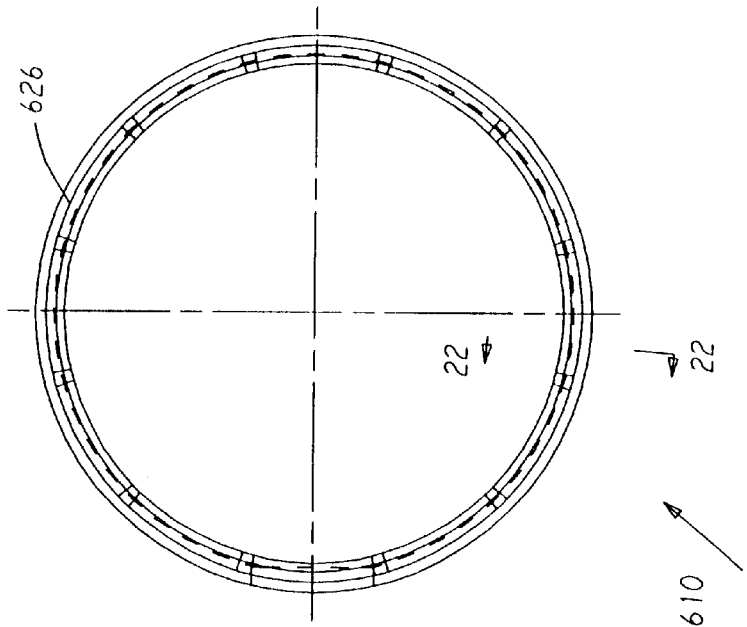
FIG. 21
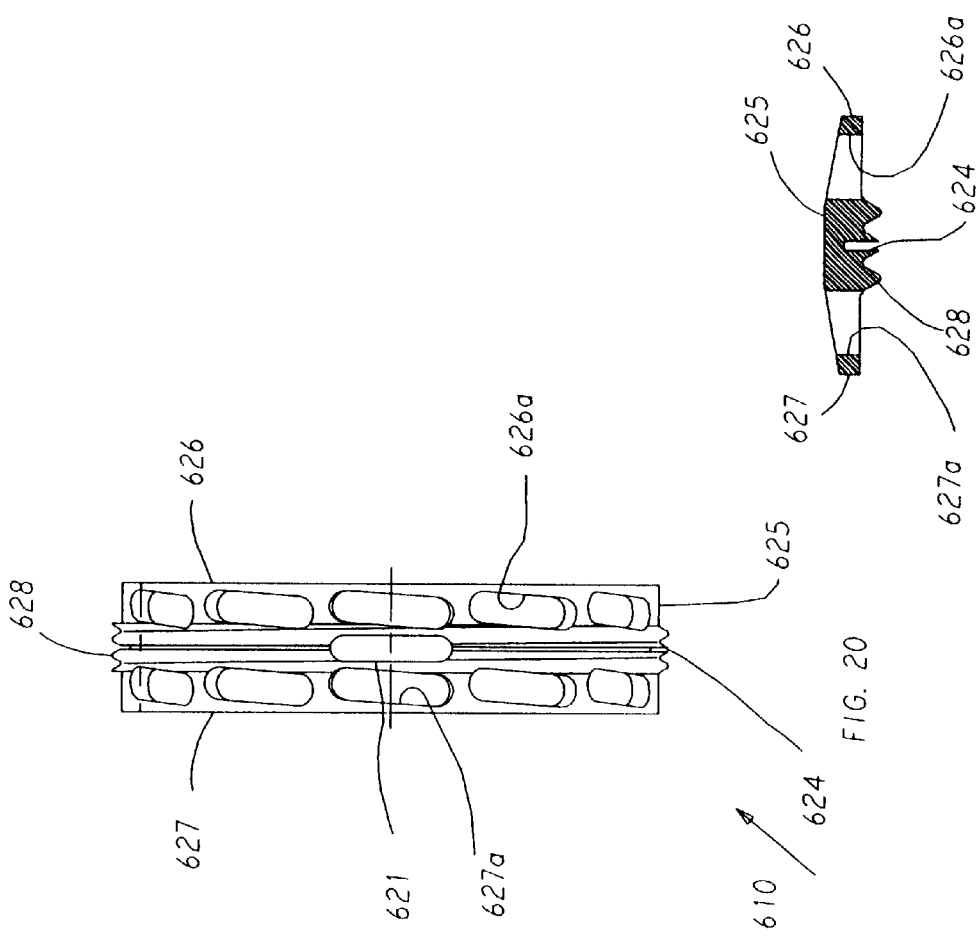
FIG. 22
FIG. 20

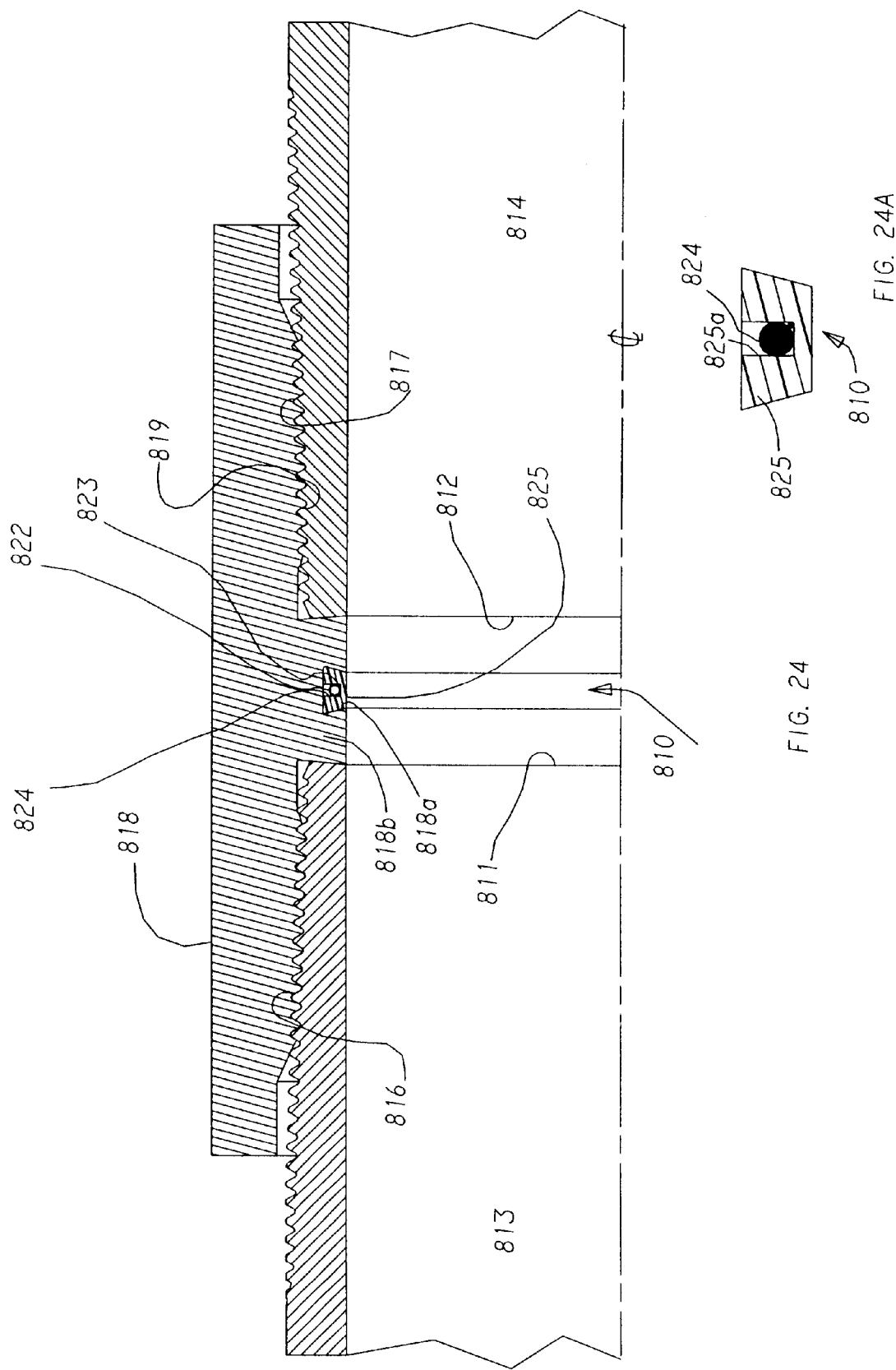

SYSTEM, METHOD AND APPARATUS FOR DEPLOYING A DATA RESOURCE WITHIN A THREADED PIPE COUPLING

BACKGROUND OF THE INVENTION

1. Field of the Invention

The present invention relates generally to a method, system and apparatus for providing the electronic transfer of information between pipe couplings and a sensor to permit the evaluation of characteristics, location and/or environment of a string of pipe connected together by the couplings. More particularly, the present invention relates to a system, method and apparatus for deploying a data resource in the form of electronically accessible information into the central area within a threaded pipe coupling intermediate the opposed ends of pipe threaded into the ends of the coupling.

As used herein, the terms "data resource" is intended to include a device or composition of matter or an electrical state of a device or composition of matter or the organization or presentation of electronically transmittable data.

2. Brief Description of the Setting of the Invention

Pipe of different sizes and types is required to drill and complete oil and gas wells. The pipe is made in a large variety of metallurgies and end connection designs. When used in drilling or constructing a well, the correct size pipe with the correct metallurgy and appropriate end connection must be employed at each of several different phases of the construction and completion of the well. During construction of the well, it may be necessary to acquire or confirm information about the well pipe. After the well is constructed, it is often necessary to secure information about the pipe or to determine the location of a subsurface tool or instrument relative to a specific part of the string of well pipe. For example, in this latter regard, it may be necessary to know how far an instrument or tool, or the end of a smaller pipe string has traveled down through a string of well pipe. The instrument or tool may be used, for example, to trigger a perforating gun at a desired subsurface location.

Pipe is customarily marked on its outer surfaces with visual information about the metallurgy and size of the pipe. External markings may also provide information about the type of end connector on the pipe. Even when external markings are present however, pipe used in well construction is usually manually reexamined and remeasured in the field before being put into use to ensure that the correct pipe in the correct amount is being used. Field measurements are typically performed using a measuring tape, gages and other length or dimensional measuring devices. These manual inspections or measurements of pipe in the field are time consuming, tedious and highly subject error.

A common method for placing an instrument or tool at a precise subsurface location within a sting of well pipe is to lower the device into the well at the end of a wireline while measuring the amount of wireline dispensed. When a given length of the wireline has been dispensed, the device is presumed to be at the subsurface location corresponding to the measured length of dispensed line.

When the position of a subsurface device is determined by measuring the amount of line that has been deployed to suspend the device in the well, variables such as well temperature and the associated line stretch must be calculated to correct the reading at the well surface. In wells that are deep, for example 15,000 feet or more, the line stretch may be substantial, causing the measurement to be mistaken by an unacceptable amount. The line measurement technique is also susceptible to human error in reading and calibration of the measuring instrument.

Another technique used to determine the location of a device within a well is to use an instrument that detects the passage of pipe connections as the device is lowered through the string of pipe. If each section of pipe is substantially the same length, the approximate depth of the device can be determined by multiplying the length of the pipe section by the number of connections traversed. The equipment required to implement this technique is relatively expensive and the accuracy can vary when the pipe sections are not of the same depth or the makeup into the coupling varies from connection to connection.

It has also been suggested to position a carrier having a data resource within a protected central grooved area of a coupling between two pin ends. The data resource is employed for communicating with an interrogating instrument lowered into the pipe string containing the coupling. The specific form of the carrier holding the data resource in this earlier design is subject to damage from engagement with the pipe ends during the coupling and pipe makeup process.

There are various other techniques available to more precisely locate a subsurface device but these techniques can also be expensive and time consuming to employ.

A primary object of the present invention is to deploy a data resource within a protected area of a threaded coupling in a novel manner that protects the data resource and permits it to communicate with an instrument temporarily positioned within the coupling.

Still another object of the present invention is to provide a novel containment ring for deploying a data resource within a threaded coupling wherein the ring is equipped with a crushable structure that accommodates limited deformation of the ring by the ends of the pipe connecting into the coupling. A related object of the present invention is to provide a crushable structure in a containment ring that does not deform into the central opening through the pipe-to-coupling connection.

Another object of the present invention is to provide a data resource that is cemented or otherwise securely anchored in the space intermediate the ends of two pipe sections threadably engaged to a coupling.

Yet another object of the present invention is to provide a data resource within a threaded pipe coupling whereby the data resource is protected from mechanical damage from engagement with the end of a pipe threadably engaged within the coupling.

It is also an object of the present invention to mount a data resource within a threaded pipe coupling whereby the rotating advance of a threaded pipe being properly threaded into the coupling cannot damage or displace the data resource.

A general object of the present invention is to deploy a data resource within a pipe coupling whereby, the resource is protected from distortion or mechanical damage caused by the advancement of the pipe ends to their maximum permitted penetration tolerance within the coupling.

An object of the present invention is to provide a carrier for a data resource that will contact the ends of the pipe in a coupling to stabilize the carrier and resist its displacement by flow of fluids through the pipe while simultaneously protecting the data resource from over-penetration of the pipe ends into the coupling.

BRIEF SUMMARY OF THE INVENTION

A preferred form of the data resource of the present invention is that of an annular containment ring having threads along its outer circumferential surface that are adapted to engage with the internal threads formed in a coupling. Deformable fingers extend axially away from the ends of the ring toward the associated coupling face. The ring is positioned within the coupling by engaging the ring threads with the coupling threads and rotating the ring until it is centralized at the midpoint of the coupling. The total axial length of the ring, including the extended fingers, is equal to the optimum desired end spacing between the end faces of the threaded pipe ends or "pins," engaged in the coupling. Penetration of a pin deeper than its optimal depth deforms the fingers without displacing or damaging the ring or the data resource associated with the ring.

The containment ring carries a microchip or other communication device within a protective receptacle formed in the ring body, or if desired, the communication device may comprise the ring itself. The data resource associated with the ring may, for example, be a passive electronic circuit, a magnetically imprinted medium or other communicating device. If desired, the communicating component or "module" may be an independently powered component. The data resource may transmit data pursuant to its own internal control and/or may transmit only in response to interrogation from a remote instrument. The energy for transmitting the data from the data resource to the inquiring instrument may be supplied by the inquiring instrument and/or may be a part of the data module. If desired, the data in the data resource and/or the operation of the data resource may be altered by separate instrument.

A modified form of the data resource may be provided by cementing and/or otherwise rigidly securing the module acting as the data resource directly to the central area of the coupling.

The foregoing objects, features and advantages of the present invention, as well as others, will be more readily apparent and appreciated from the following drawings, specification and claims.

BRIEF DESCRIPTION OF THE DRAWINGS

FIG. 2 is a side elevation of a preferred form of a castle top containment ring for deploying a data resource within an internally threaded coupling;

FIG. 3 is a front elevation of the containment ring of FIG. 2;

FIG. 4 is a cross sectional view taken along the line 4—4 of FIG. 3;

FIG. 5 is a side elevation illustrating a modified form of a containment ring of the present invention equipped with multiple radial circular openings to accommodate axial crushing of the ring without displacing the ring from is position at the center of a coupling;

FIG. 6 is a front elevation of the containment ring of FIG. 5;

FIG. 7 is a cross sectional view taken along the line 7—7 of FIG. 6;

FIG. 8 is a side elevation of a modified form of the containment ring of the present invention illustrating aligned circumferentially disposed slots adapted to absorb end crushing between pipes engaged with a coupling;

FIG. 9 is a front elevation of the containment ring of FIG. 8;

FIG. 10 is a cross sectional view taken along the line 10—10 of FIG. 9;

FIG. 11 is a side view elevation of a modified form of the containment ring of the present invention illustrating non-aligned, circumferentially disposed slots employed to absorb axial crushing of the ring;

FIG. 12 is a front elevation of the containment ring of FIG. 11;

FIG. 13 is a cross sectional view taken along the line 13—13 of FIG. 12;

FIG. 14 is a side elevation of a modified form the containment ring of the present invention illustrating four circumferentially extending bellows grooves for axial crush absorption;

FIG. 15 is a side elevation of the containment ring of FIG. 14;

FIG. 16 is a cross section taken along the line 16—16 of FIG. 15;

FIG. 17 is a side elevation illustrating a modified form of the containment ring of the present invention equipped with eight circumferentially extending bellow grooves providing crush absorption for the containment ring;

FIG. 18 is a side elevation of the containment ring of FIG. 17;

FIG. 19 is a cross sectional view taken along the line 19—19 of FIG. 18;

FIG. 20 is a modified form of the containment ring of the present invention illustrating helically oriented slots adapted to absorb axial crush forces applied to the containment ring;

FIG. 21 is a front elevation of the containment ring of FIG. 20;

FIG. 22 is a cross sectional view taken along the line 22—22 of FIG. 21;

FIG. 24 is a quarter sectional view of a modified form of the present invention deploying a data resource in an annular dovetail groove formed in a central internal shoulder of premium threaded coupling;

FIG. 24A is an enlarged cross sectional view of the data resource carrier illustrated in FIG. 24;

DESCRIPTION OF THE ILLUSTRATED EMBODIMENTS

Figure 1:
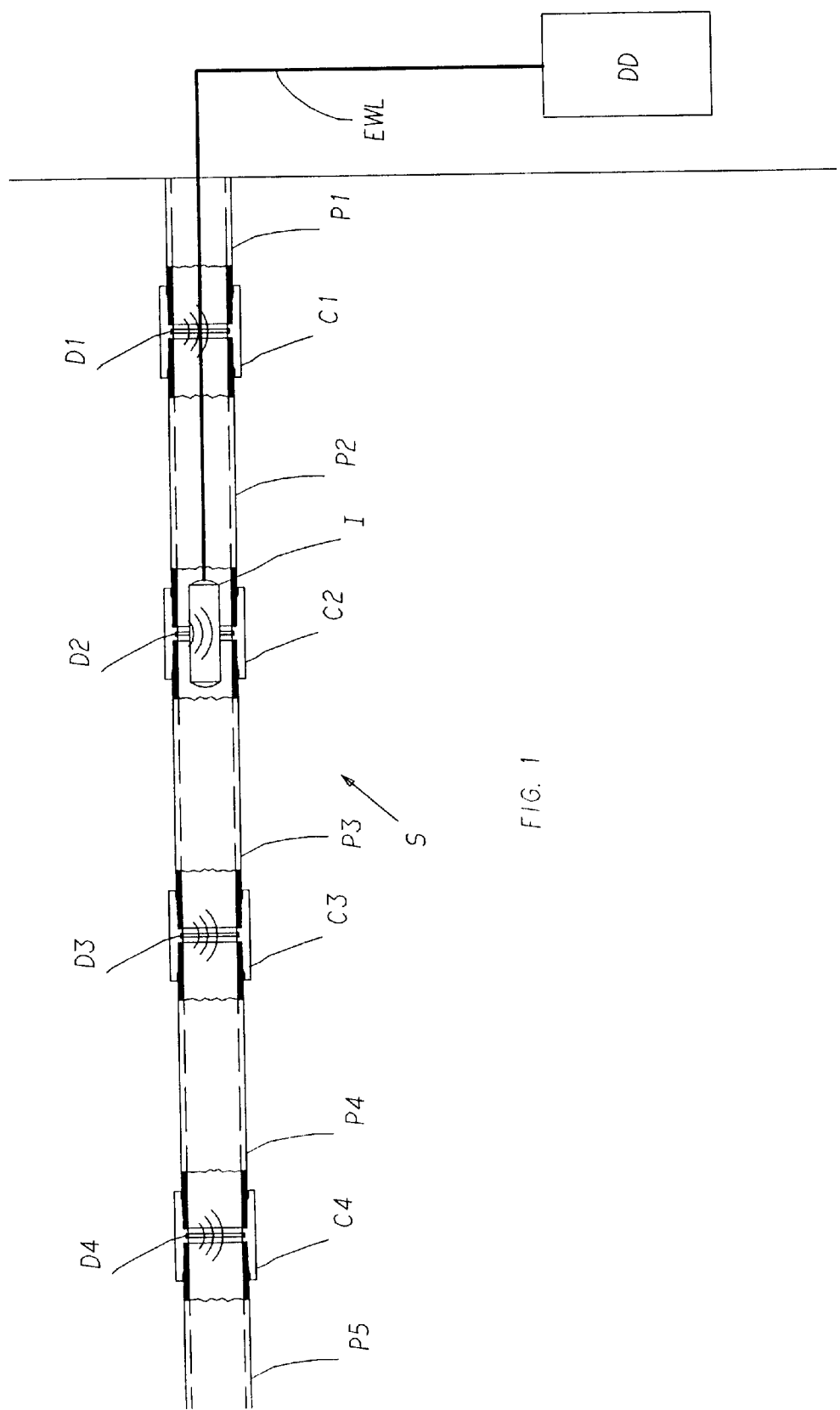
FIG. 1 is a vertical schematic illustration of a well string system equipped with data resources in the couplings securing the individual pipe sections of the string together.

FIG. 1 illustrates a system of the present invention indicated generally at S. The system S includes pipe segments or "joints" P1–P5 connected together by couplings C1–C4 to form a string of pipe that extends down into the earth for extracting minerals or for other purposes. Each of the couplings C1–C4 is equipped with a data resource D1–D4 that contains information specific to the coupling with which it is associated. Thus, D1 may contain information indicating that it is associated with a specific coupling C1 or that it is connecting pipe sections P1 and P2 or that it occupies a specific location within the string or is located at a given distance below the well surface. Additionally, information regarding the type of coupling, the type of pipe, the type of end connection, the metallurgy of the components connecting the well string together, as well as other information, may be contained within the data resource D1–D4.

The data resources D1–D4 communicate with an instrument I suspended in the string of pipe by an electric wire line EWL. A display device DD communicates through the electric wire line EWL with the instrument I to display the information obtained by the instrument I from the data resource. If desired, the instrument I may communicate with the data resource and augment or alter the information contained in the resource. Additionally, the power for driving the data resources D1–D4 may be provided by the instrument I or, if desired, may be contained internally within each of the data resources D1–D4.

The present invention is directed to the methods and means for affixing the data resources within the coupling whereby each data resource is protected during the assembly of the pipe sections into the coupling and whereby the data resource is effectively able to communicate with the instrument I from its deployed position within the coupling. Placement of a data resource within a coupling, the specific information contained in the data resource and the process of communicating with the individual data resource elements are not, per se, a part of the present invention.

The data resource components D1–D4 are configured to occupy the central area of an internally threaded coupling, such as an API eight round or buttress coupling. In certain configurations, the data resource takes on the form of a containment ring that is dimensioned to fit between the ends of the pipe engaged in either end of the coupling. The internal clearance through the containment ring is optimally designed to be the same as that of the pipe engaged in the coupling to minimize turbulent flow of well fluids through the pipe-to-coupling connection.

The system of the present invention comprises a string of pipe secured together by couplings equipped with the data resource of the present invention. The method of the present invention comprises the use of specially configured containment rings to contain and protect the data resource element by providing a controlled crushing of the containment ring.

Figure 1A:
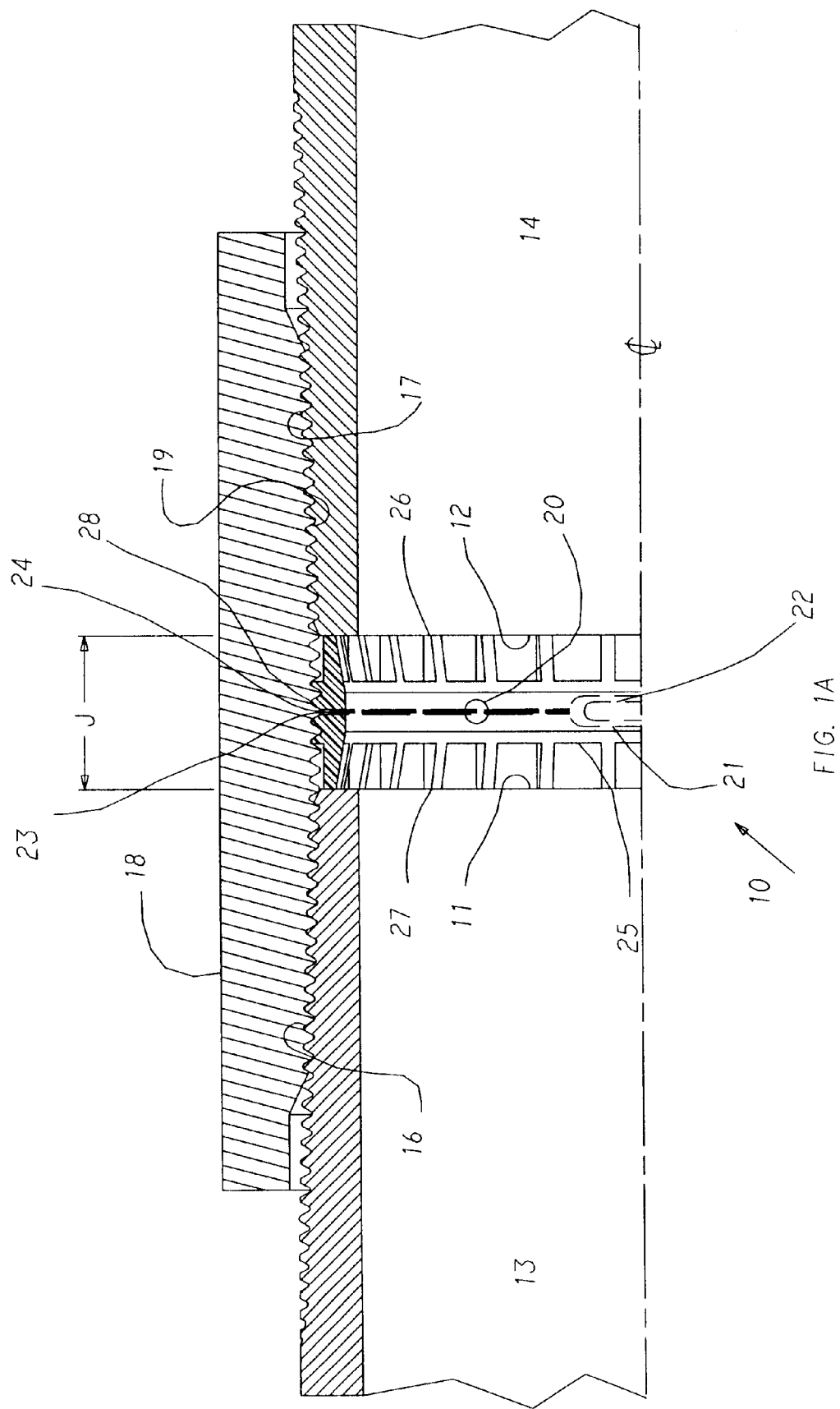
FIG. 1A is a quarter sectional view illustrating an internally threaded coupling securing two pipes together with a castle top containment ring of the present invention disposed between the ends of the two pipes.

A preferred form of the present invention, embodied as a castle top containment ring is indicated generally at 10 in FIG. 1A. The ring 10 is disposed between the ends 11 and 12 of externally threaded pipes 13 and 14, respectively. The pin of the pipe 13 is equipped with threads 16 formed along the external surface of the pipe adjacent the end 11. Similarly threads 17 are formed on the external end surface of the pin of the pipe 14. A coupling 18 is provided with internal threads 19 that engage the threads 16 and 17 and secure the two pipes 13 and 14 together.

Figure 1B:
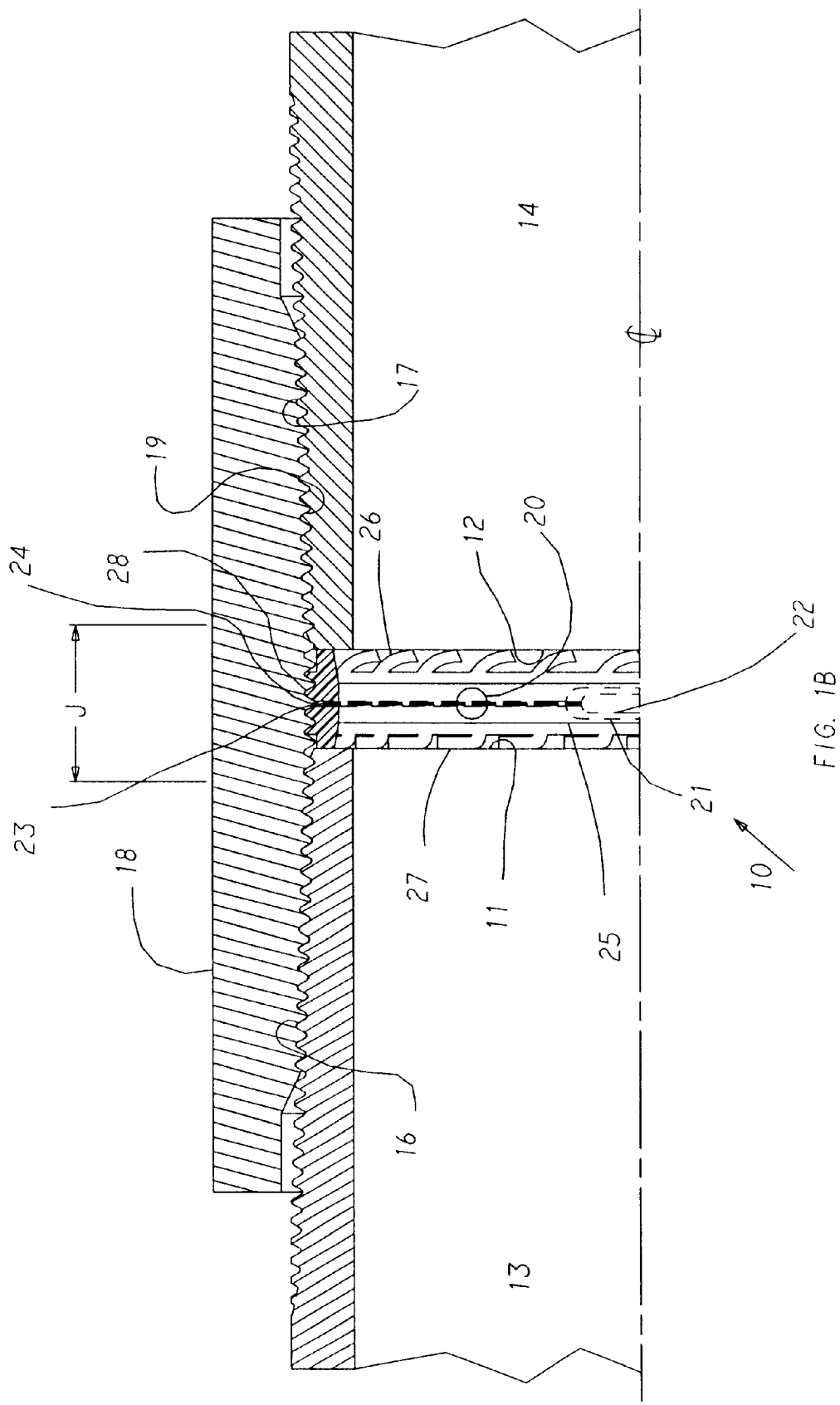
FIG. 1B is a quarter sectional view of the containment ring of FIG. 1 as it appears when the ends of the pipe are advanced into the coupling beyond the optimum specified position.

As may be seen by joint reference to FIGS. 1A, 1B, and 2, two radial bores 20 extend through the retention ring 10 to be employed with a placement tool (not illustrated) for threading the retention ring through the coupling to the exact center of the coupling into the position illustrated in FIGS. 1A and 1B. A receptacle 21 indicated in broken lines along the outer surface of the retention ring 10 receives a data communication component or "data module" 22 also depicted in broken lines. The module 22 may be a miniature transmitter/receiver or some form of active or passive recording medium that carries specific information relative to the coupling 18 and its associated environment. The module 22 connects electrically with a loop antenna 23 indicated in broken lines carried in a circumferential groove 24 formed along the external surface of a ring body 25.

The containment ring 10 is provided with deformable fingers 26 and 27 that extend axially away from the central ring body 25. The containment ring 25 is illustrated coaxially deployed at the center of the coupling 18 where it is held in position by threads 28 formed along the external circumferential surface of the ring body. The threads 28 mate with the internal threads 19 of the coupling to retain the body 25 at the center of the coupling 18.

As may be seen by joint reference to FIGS. 1A–4, the module 22 and the antenna 23 are safely protected within the body 25 of the containment ring 10. The flexible fingers 26 and 27 assist in supporting the body 25 centrally within the coupling 18 between the ends of the pipe engaged in the coupling while simultaneously accommodating the rotating, crushing movement exerted on the ring assembly 10 by the advance of the pipes into the coupling.

The coupling 18 and threaded ends of pipes 13 and 14 illustrated in FIG. 1 are exemplary of an American Petroleum Institute (API) threaded and coupled connection equipped with eight round threads. The pipes 13 and 14 are illustrated "made up," i.e. threadably engaged, to an acceptable API position within the coupling 18.

The recommended API procedure for securing together eight round threads requires that the ends 11 and 12 of the pipe must be made up into the coupling within a defined distance from the adjacent end of the "J" dimension of the coupling. In many API sizes, the J dimension is the center 1" space of the coupling and the tolerance for the pipe end is ±¼" from the end of the J dimension. Thus, when properly made up with the API coupling, the pipe ends 11 and 12 may not be closer together than ½" and may not be spaced further apart than 1½".

The retention ring 10 is dimensioned so that the space occupied by the ring body 25 and the fully deflected fingers 26 and 27 (caused by advancement of the pins into the box) will occupy the minimum allowed space at an acceptable API approved connection position. With both pins made up into their maximum permitted penetrating position, the remaining space between the two pipe ends for a connection that is within the API specification is ½". Accordingly, the retention ring body 25 and the fingers 26 and 27 are sized to allow the fingers to be fully deflected against the ring body 25 within a space of ½" between the ends of the pipe. Thus, it will be appreciated that the selection of component sizes for pipe having the described API makeup tolerance is such that the collapsed or crushed form of the retention ring is equal to or less than an axial length of ½". It will be understood that it may be desirable to provide a retention ring having a significantly smaller collapsed dimension to protect the data resource even in connections that are made up beyond the permitted API tolerance.

FIG. 1B illustrates the data resource 10 positioned between the two pipe ends 11 and 12 after the pipe ends have penetrated the coupling 18 beyond the end limits of the J dimension. The fingers 27 engaging the pipe end 11 are seen to be compressed further against the ring body 25 than the fingers 26. The difference is due to the greater penetration of the pipe 13 into the coupling.

As may be noted by reference to FIG. 1B, the fingers 26 and 27 are pointing in different directions. The pipes 13 and 14 are rotated in opposite directions during their make up thus accounting for the different direction of deflection of the fingers. It may also be appreciated by reference to FIG. 1B that the lengths of the fingers 26 and 27 are such that their crests do not engage the base of an adjacent finger when the fingers are fully deflected against the ring body 25. This feature permits the collapsed form of the retention ring to occupy a smaller axial dimension within the coupling.

The containment ring 10 may be constructed of a polymer of polytetrafluoroethylene, such as Teflon® or other suitable material. The material of the ring 10 is preferably such that it may withstand the well environment and does not hamper the electronic transfer of data to and from the data module. The containment ring may be machined or cast from a suitable material. The data module 22 may be cemented into the receptacle 21 or otherwise suitably held in place during the positioning of the ring within the coupling. The loop antenna 23 may be routed around the circular bores 20 to keep the bore fully open to receive the drive pins (not illustrated) from the placement tool used to position the ring within the coupling.

Throughout the description that follows, similar reference characters depict similar or equivalent structure and compositions in the various embodiments. The equivalent or similar structures for different embodiments are identified by reference characters that differ from each other by a magnitude of 100. Unless otherwise noted, the construction, function and use of corresponding components are similar or equivalent in each of the embodiments.

FIG. 5 illustrates a modified form of the containment ring indicated generally at 110. The ring 110 includes a circumferentially extending recess 121 for holding a data module. The ring 110 is equipped with standoff rims 126 and 127 on either side of circumferentially disposed threads 128. Multiple, radially extending bores 126a and 127a extend through the rims 126 and 127, respectively, to provide crush space for the containment ring 110. A central groove 124 extending circumferentially about the containment ring provides a recess for receiving an elongate antenna or other device for providing communication with the instrument used to interrogate or communicate with the data module carried in the receptacle 121 and groove 124.

In use, the containment ring 110 is threaded into position into the center location of a threaded coupling as indicated with the embodiment of FIGS. 1A–4. The threads 128 on the ring body 125 are adapted to engage the internal threads of the coupling to secure the ring to the central area of the coupling and hold it in place against axially directed displacement forces.

When the pipe ends are made up into the coupling, the ends of the pipe engage the end faces of the rims 126 and 127 if the pipe is advanced beyond the J area dimension. The relative size of the boreholes 126a, 127a and the axial dimensions of the rims 126, 127 as well as the axial length of the body 125 cooperate so that the ring 110 may be crushed to a total axial dimension less than the spacing between the two pipe ends when the pipe ends are at the penetration extremes of the tolerance for their API make up.

FIGS. 8–10 illustrate yet another modification of the containment ring of the present invention indicated generally at 210. The containment ring includes a receptacle 221 employed to receive and protect a radio transmitter/receiver or other data module. An annular groove 224 extending around a ring body 225 is employed to contain and protect an antenna or other functional component of the data module.

The containment ring 210 is provided with circumferentially extending slots 226a formed in one axial rim 226 of the ring body. Circumferentially extending slots 227a are provided in the opposite rim 227 of the containment ring. Threads 228 are provided along the central external surface of the containment ring 210 for engagement with the internal threads of the coupling with which the containment ring is to be employed.

The alignment of the slots 226a and 227a is selected to provide a controlled crushing resistance to the engagement of the ends of the containment ring by the ends of pipe being made up into a coupling containing the ring.

FIGS. 11–13 illustrate a modified form of the data resource of the present invention indicated generally by the containment ring 310. The embodiment of FIGS. 11–13 is similar to the previously described embodiment of FIGS. 8–10 with the exception that the circumferential slots 326a and 327a are non-aligned. The result is that the containment ring 310 is less stiff than the ring 210 and may be more easily crushed by engagement of the ends of the pipe being made up into the coupling within which the containment ring is positioned.

FIGS. 14–16 illustrate a modified form of the data resource of the present invention configured as a containment ring indicated generally at 410. The containment ring 410 is similar to the containment rings previously described with the exception that the crush structure of the containment ring 410 is provided by bellows-type annular grooves in the rims 426 and 427 of the containment ring. The bellows grooves are exemplified by the grooves 426a, 426b, 426c and 426d in the rim 426 of the containment ring. When the ends of a pipe engage the rim 426 of the containment ring 410, the bellows grooves accommodate an axial collapse of the rim 426 to prevent the containment ring 410 from being displaced and to protect a data communicating device carried in the receptacle 421.

FIGS. 17–19 illustrate a modified form of the data resource of the present invention embodied as a containment ring indicated generally at 510. The containment ring 510 is similar to the containment ring 410 illustrated in FIG. 14 with the exception that additional bellows grooves have been added to make the ring less stiff and thus more easily collapsed.

FIG. 20 illustrates a modified form of the data resource of the present invention in the embodiment of a containment ring indicated generally at 610. The containment ring 610 is similar to the rings 210 and 310 illustrated previously with the exception that the circumferentially extending slots 626a and 627a are helically oriented and are circumferentially aligned. The arrangement of the helical orientation and circumferential alignment provides a controlled crush resistance for the containment ring 610. The difference in the crush resistance between that of the previously described embodiments is employed for a particular application requiring the controlled collapse of the containment ring with a specific coupling and pipe combination.

Figure 23:
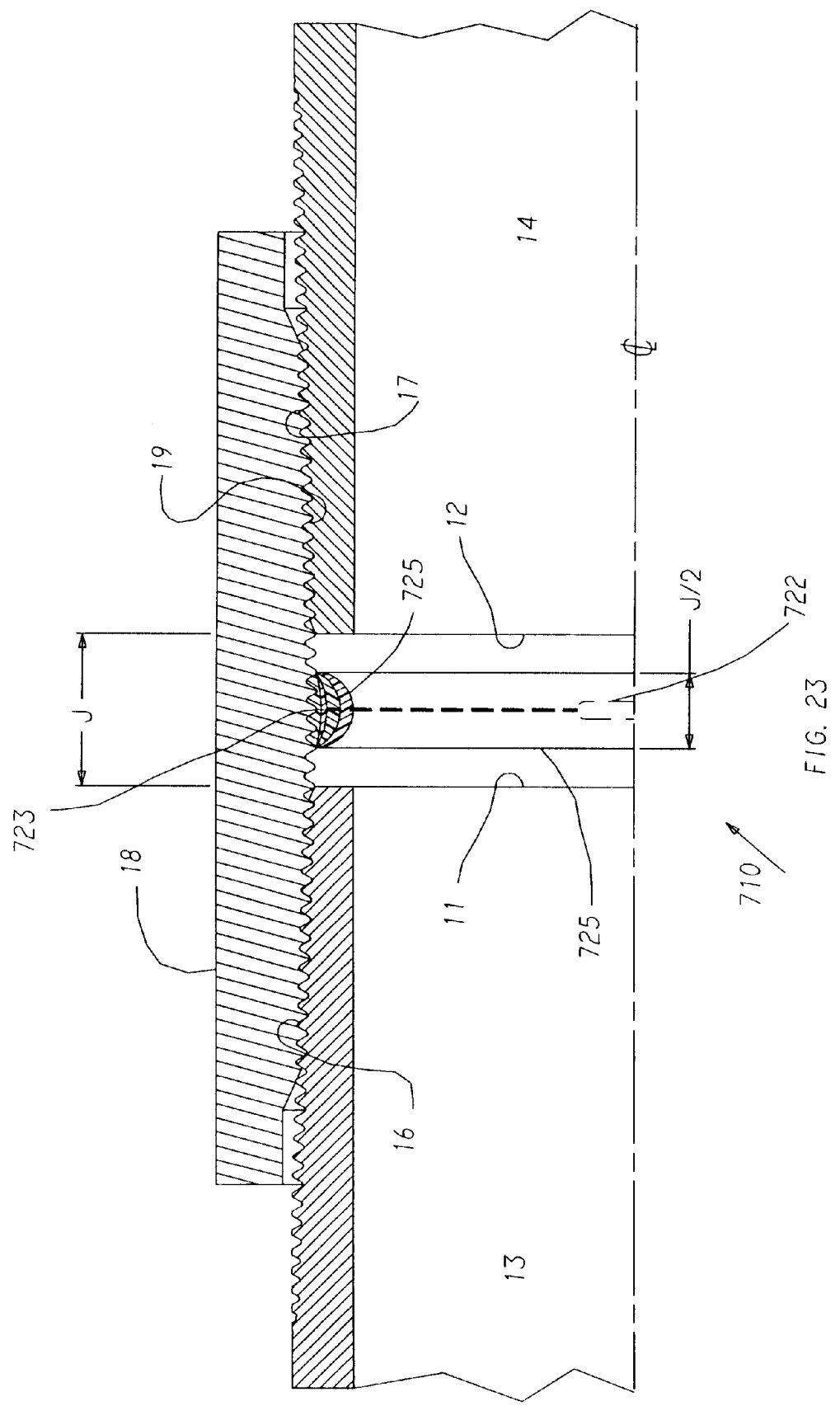
FIG. 23 is a quarter sectional view of a modified form of the present invention employing a data resource connected directly to the central area of an internally threaded coupling.

FIG. 23 illustrates a modified form of the data resource of the present invention indicated in the embodiment of a cemented electronic device indicated generally at 710. A transmitter or other electronic data resource module 722, or other suitable information communicating mechanism or device, is held in position along the center line of the coupling 18 by a cement retention body 725. The body 725 is formed by the applications of multiple successive coatings of an ultraviolet activated resin or a thermal setting resin such as Riton®, or other suitable material. An antenna 723 comprises a part of the data module and is electrically secured to the communication device 722. The cement body 725 extends axially less than one-half of the coupling J dimension. As thus deployed within the coupling 18, the data resource 710 is protected from being crushed by the ends 11 and 12 of the pipes 13 and 14 so long as the pipe is made up within API tolerance. The cement body 725 may be made of any suitable material that is compatible with use in a well environment and functions to securely retain the device 722 and antenna 723 at the appropriate location within the metal coupling.

The information resource 710 is constructed within the coupling 18 by placing the transmitter 722 along the center line of the coupling and applying layers of the cement coating over the transmitter and antenna 723. The cement bonds the transmitter and antenna to the internal threaded surface of the coupling 18. The radial depth of the cement body 725 may be approximately the same as the radial thickness of the pipe made up into the coupling to reduce turbulent flow through the pipe and coupling.

FIG. 24 illustrates a form of the carrier ring of the present invention indicated generally at 810 for use in a premium threaded coupling having a central shoulder that is engaged by the ends of premium threaded pins held together by the coupling. It will be appreciated that the design of FIG. 24 is also applicable to the box of integral joint pipe connections that have the box formed integrally at the end of the pipe section, The containment ring 810 is illustrated disposed within a dovetail groove 818a formed within a central shoulder 818b formed internally of a coupling 818. Pipe pins 813 and 814 are threadably received within the coupling 818. the pin threads 816 and 817 and box threads such as 819 are of a non API configuration sometimes referred to as premium threads. Proper makeup of the pin ends 813 and 814 with the coupling 818 requires the pin ends 811 and 812 to engage and bear against the internal shoulder 818b.

As best seen in FIG. 24A, the carrier ring 810 is provided with a dovetail-shaped body 825. Placement of the carrier ring in the dovetail groove protects the data resource from damage. The dovetail fit between the body 825 of the carrier ring and the shoulder slot 818a keeps the ring locked in the slot. An antenna 824 for the date resource is carried in a groove 825a formed in the ring body 825. The carrier ring 810 is constructed of a material with sufficient flexibility so that the ring body 825 may be resiliently collapsed toward the groove 825a as the ring is inserted into the dovetail shoulder groove 818a. Once the compressed body 825 is received within the groove 818a, the resiliency of the body restores the ring to its fully expanded shape illustrated in FIG. 24.

Figure 26:
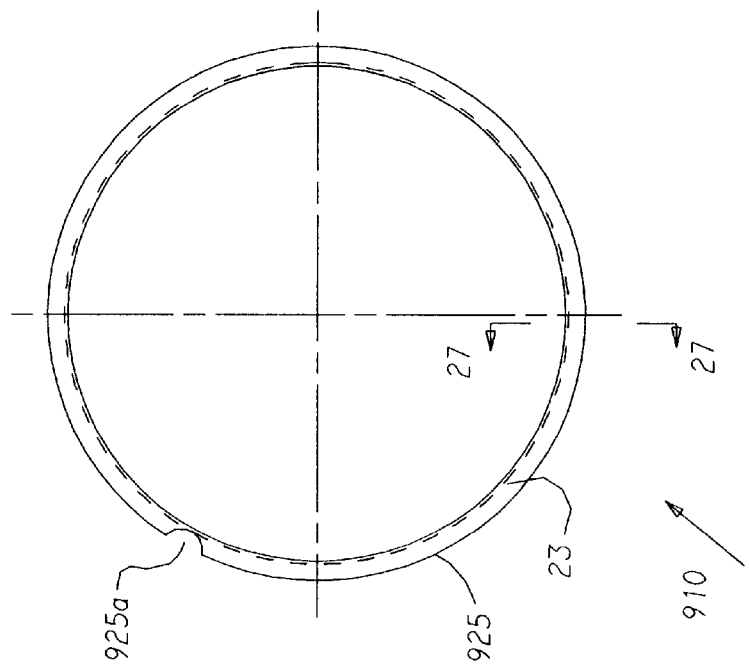
FIG. 26 is a front elevation of the carrier illustrated in FIG. 25.
Figure 27:
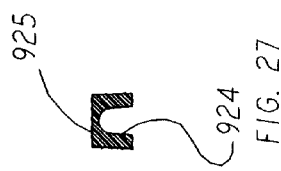
FIG. 27 is a cross sectional view taken along the line 27—27 of FIG. 26.
Figure 25:
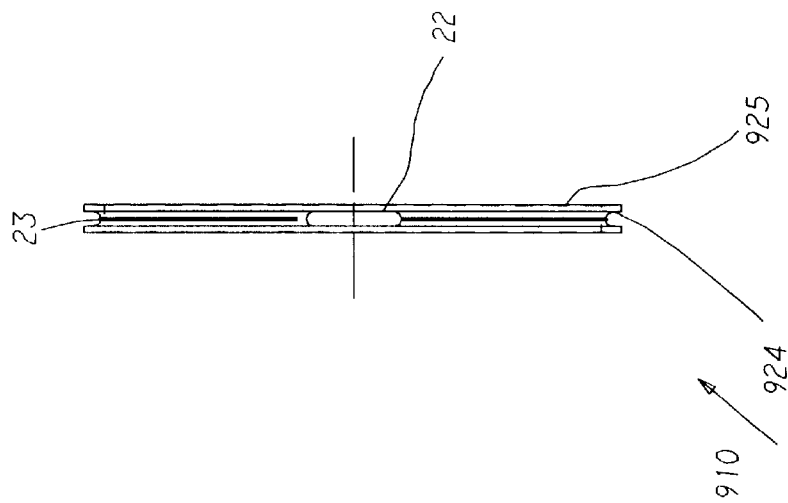
FIG. 25 is a side elevation of a modified data resource for insertion into a coupling groove having a dovetail groove formed in a central internal shoulder of a premium threaded coupling.

FIGS. 25–27 illustrate a carrier ring indicated generally at 910 employed for insertion into a dovetail cross-sectional groove formed in the external shoulder of the premium threaded coupling. The ring 910 is configured as an annular ring body 925 having an annular internal groove 924 formed along its outer circumferential surface. A data resource 22 is deployed in a circumferentially extending recess formed in the body 925 while a communications antenna 23 is deployed circumferentially within the groove 924.

A radially reduced area or notch 925a provided along the outer circumference of the body 925 allows the body to be temporarily collapsed radially for insertion into the box groove.

While a preferred embodiment of the present invention has been illustrated in detail, it is apparent that modifications and adaptations of the preferred embodiment will occur to those skilled in the art. However, it is to be expressly understood that such modifications and adaptations are within the spirit and scope of the present invention as set forth in the following claims.

What is claimed is:

1. An apparatus for deploying a data resource within a threaded pipe coupling, comprising:

an annular containment ring having an annular body with a central axis and a radially external circumferential engagement surface adapted to engage an internal structure of an internally threaded coupling, a data communication component carried in said annular body, a crushable structure extending axially from said annular body for protecting said data communication component from axially imparted crushing forces exerted by a threaded pipe pin that may be engaged in a coupling containing said containment ring; and wherein said crushable structure comprises deformable fingers.

2. An apparatus as defined in claim 1 wherein said containment ring is combined with a threaded pipe coupling.

3. An apparatus as defined in claim 1 wherein said containment ring is disposed substantially midway between first and second axial ends of said coupling.

4. An apparatus for deploying a data resource within a threaded pipe coupling, comprising:

an annular containment ring having an annular body with a central axis and a radially external circumferential engagement surface adapted to engage an internal structure of an internally threaded coupling, a data communication component carried in said annular body, a crushable structure extending axially from said annular body for protecting said data communication component from axially imparted crushing forces exerted by a threaded pipe pin that may be engaged in a coupling containing said containment ring; and wherein said crushable structure multiple comprises multiple radially extending bores in said annular body.

5. An apparatus for deploying a data resource within a threaded pipe coupling, comprising:

an annular containment ring having an annular body with a central axis and a radially external circumferential engagement surface adapted to engage an internal structure of an internally threaded coupling, a data communication component carried in said annular body, a crushable structure extending axially from said annular body for protecting said data communication component from axially imparted crushing forces exerted by a threaded pipe pin that may be engaged in a coupling containing said containment ring; and wherein said crushable structure comprises circumferentially extending slots formed in an axial rim of said annular body.

6. An apparatus as defined in claim 5 wherein circumferential slots in said standoff rims are non-aligned circumferentially relative to each other for reducing the stiffness of said crushable structure.

7. An apparatus as defined in claim 5 further comprising helically oriented and circumferentially aligned circumferential slots in said standoff rims.

8. An apparatus for deploying a data resource within a threaded pipe coupling, comprising:

an annular containment ring having an annular body with a central axis and a radially external circumferential engagement surface adapted to engage an internal structure of an internally threaded coupling, a data communication component carried in said annular body, a crushable structure extending axially from said annular body for protecting said data communication component from axially imparted crushing forces exerted by a threaded pipe pin that may be engaged in a coupling containing said containment ring; and wherein said crushable structure comprises one or more bellows grooves formed in standoff rims.

9. An apparatus as defined in claim 8 wherein said standoff rims include multiple bellows grooves.

10. An apparatus for deploying a data resource within a threaded pipe coupling, comprising:

an annular containment ring having an annular body with a central axis and a radially external circumferential engagement surface adapted to engage an internal structure of an internally threaded coupling, a data communication component carried in said annular body, a crushable structure extending axially from said annular body for protecting said data communication component from axially imparted crushing forces exerted by a threaded pipe pin that may be engaged in a coupling containing said containment ring; and wherein said crushable structure comprises layered coatings of bonding material overlying said data communication component and extending axially away from said data communication component.

11. An apparatus for deploying a data resource within a threaded pipe coupling, comprising:

an annular containment ring having an annular body with a central axis and a radially external circumferential engagement surface adapted to engage an internal structure of an internally threaded coupling, a data communication component carried in said annular body, a crushable structure extending axially from said annular body for protecting said data communication component from axially imparted crushing forces exerted by a threaded pipe pin that may be engaged in a coupling containing said containment ring; and wherein said external annular engagement surface comprises threads adapted to mate with threads in said coupling.

12. A system for deploying data resources in a string of multiple pipe sections wherein said pipe sections are connected together by multiple, internally threaded pipe couplings and wherein each of said couplings secures together axial ends of two adjoining threaded pipe sections having threads that are oppositely rotated relative to said coupling to connect within said coupling whereby an annular area is provided within each said coupling between axial ends of pipe sections joined by each said coupling, comprising:

an annular containment ring carried in each of said annular areas, a data communication component deployed in each of said annular containment rings, and a crushable structure extending axially from said annular body for protecting said data communication component from axially imparted crushing forces exerted by a threaded pipe pin engaged in each said coupling.

13. A system as defined in claim 12 wherein each of said annular containment rings comprises an annular body with a central axis and a radially external engagement surface adapted to engage an internal structure of the internally threaded coupling within which said containment ring is carried.

14. A system as defined in claim 13 wherein said crushable structure in each of said containment rings extends axially from first and second, opposed axial ends of said annular body.

15. A system as defined in claim 14 wherein said crushable structure in each of said containment rings comprises one or more bellows grooves formed in standoff rims.

16. A system as defined in claim 13 wherein said external engagement surface on each of said containment rings comprises threads adapted to mate with threads in the coupling within which said containment ring is carried.

17. A system as defined in claim 16 wherein each of said containment rings is disposed substantially midway between axial ends of each of the couplings within which said containment ring is carried.

18. A system as defined in claim 12 wherein said crushable structure in each of said containment rings comprises deformable fingers.

19. A system as defined in claim 12 wherein said crushable structure in each of said containment rings comprises radially perforated standoff rims.

20. A method for deploying a data resource within an internally threaded pipe coupling, of the type in which threaded pipe pins are oppositely rotated relative to said coupling to advance said pipe pins into said coupling, comprising:

mounting a data communication component within an annular body of a containment ring, said containment ring having a central axis and a crushable structure extending axially from said annular body for protecting said data communication component from axially imparted crushing forces exerted by a threaded pipe pin that may be engaged in said coupling, said containment ring further having a radially external circumferential engagement surface adapted to engage an internal surface of said coupling, centrally positioning said containment ring coaxially within said pipe coupling with said radially external engagement surface engaging an internal surface of said coupling, and advancing at least one externally threaded pin into said coupling and into engagement with said crushable structure without axially displacing said data communication component.

21. A method as defined in claim 20, further comprising advancing threaded pins into two axial ends of said coupling and into engagement with axial ends of said crushable structure.

22. A method as defined in claim 20 wherein said containment ring is positioned within a J-area of said coupling.

23. A method as defined in claim 20 wherein said containment ring engagement surface comprises threads and wherein said containment ring is positioned within said pipe coupling by threadedly advancing said containment ring through said coupling.

24. A method as defined in claim 23 wherein said containment ring is positioned within a J-area of said coupling.

* * * * *